US012199754B2

United States Patent
Shibaike et al.

(10) Patent No.: US 12,199,754 B2
(45) Date of Patent: Jan. 14, 2025

(54) TRANSMISSION DEVICE, RECEPTION DEVICE, TRANSMISSION METHOD, AND RECEPTION METHOD

(71) Applicant: Panasonic Intellectual Property Corporation of America, Torrance, CA (US)

(72) Inventors: Naoya Shibaike, Kanagawa (JP); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 307 days.

(21) Appl. No.: 17/633,911

(22) PCT Filed: Jun. 3, 2020

(86) PCT No.: PCT/JP2020/021938
§ 371 (c)(1),
(2) Date: Feb. 8, 2022

(87) PCT Pub. No.: WO2021/029124
PCT Pub. Date: Feb. 18, 2021

(65) Prior Publication Data
US 2022/0294553 A1 Sep. 15, 2022

(30) Foreign Application Priority Data
Aug. 15, 2019 (JP) .................. 2019-149143

(51) Int. Cl.
*H04L 1/00* (2006.01)
*H04L 1/08* (2006.01)
(Continued)

(52) U.S. Cl.
CPC .............. *H04L 1/0007* (2013.01); *H04L 1/08* (2013.01); *H04W 72/0446* (2013.01); *H04W 72/20* (2023.01)

(58) Field of Classification Search
CPC ....... H04L 1/0007; H04L 1/0041; H04L 1/08; H04L 1/18; H04L 27/2602; H04L 5/0044; H04W 72/0446; H04W 72/20
See application file for complete search history.

(56) References Cited

U.S. PATENT DOCUMENTS

2018/0069653 A1 3/2018 Fujishiro et al.
2018/0324771 A1 11/2018 Hosseini et al.
(Continued)

FOREIGN PATENT DOCUMENTS

JP 2019-521552 A 7/2019
WO 2016/185945 A1 11/2016
(Continued)

OTHER PUBLICATIONS

Extended European Search Report, dated Sep. 9, 2022, for European Patent Application No. 20852252.4-1203. (10 pages).
(Continued)

*Primary Examiner* — Awet Haile
(74) *Attorney, Agent, or Firm* — Seed IP Law Group LLP (57) ABSTRACT

The present invention improves the reliability of a transmission channel. A transmission terminal according to the present invention is equipped with: a control circuit that, on the basis of a time resource quantity used to determine the transmission size of a first channel in one time segment of either a first time segment in which the first channel and a second channel are disposed or a second time segment in which the first channel is disposed, determines the transmission size in the other time segment; and a transmission circuit that, on the basis of the determined transmission size, performs a transmission process for the first channel in the first time segment and the second time segment.

12 Claims, 5 Drawing Sheets

(51) Int. Cl.
*H04W 72/04* (2023.01)
*H04W 72/0446* (2023.01)
*H04W 72/20* (2023.01)

(56) References Cited

U.S. PATENT DOCUMENTS

| | | | |
|---|---|---|---|
| 2019/0149274 | A1 | 5/2019 | Freda et al. |
| 2020/0236728 | A1* | 7/2020 | Yi .................... H04L 5/0082 |
| 2020/0383114 | A1* | 12/2020 | Zhang ............... H04W 72/0446 |
| 2021/0007096 | A1 | 1/2021 | Huang et al. |
| 2022/0201711 | A1* | 6/2022 | Lee ..................... H04W 72/20 |
| 2022/0210768 | A1 | 6/2022 | Zhou et al. |
| 2022/0225353 | A1 | 7/2022 | Peng et al. |

FOREIGN PATENT DOCUMENTS

| | | |
|---|---|---|
| WO | 2018/204635 A2 | 11/2018 |
| WO | 2019/138511 A1 | 7/2019 |

OTHER PUBLICATIONS

Intel Corporation, "Design of physical layer procedures for NR V2X sidelink communication," R1-1904299, Agenda item: 7.2.4.5, 3GPP TSG RAN WGI RAN1#96bis, Xi'an, China, Apr. 8-12, 2019. (11 pages).

LG Electronics, "Discussion on resource allocation and TBS determination," R1-1717965, Agenda Item: 7.3.3.1, 3GPP TSG RAN WG1 Meeting #90bis, Prague, CZ, Oct. 9-13, 2017. (18 pages).

Panasonic, "Discussion on sidelink resource allocation in mode 2 for NR V2X," R1-1908804, Agenda Item: 7.2.4.2.2, 3GPP TSG RAN WG1 #98 Prague, Czechia, Aug. 26-30. (4 pages).

3GPP, "3rd Generation Partnership Project; Technical Specification Group Radio Access Network; NR; Physical layer procedures for data (Release 15)," 3GPP TS 38.214 V.15.6.0, Jun. 2019, 105 pages.

International Search Report, mailed Sep. 8, 2020, for International Application No. PCT/JP2020/021938 (5 pages including translation).

Samsung, "Considerations on Sidelink HARQ Procedure," R1-1901052, Agenda item: 7.2.4.1.5, 3GPP TSG RAN WG1 Ad-Hoc Meeting 1901, Taipei, Taiwan, Jan. 21-25, 2019. (8 pages).

3GPP TS 38.306 V15.6.0, "3rd Generation Partnership Project; Technical Specification Group Radio Access Network; NR; User Equipment (UE) radio access capabilities (Release 15)," Jun. 2019. (53 pages).

3GPP TS 38.331 V15.6.0, "3rd Generation Partnership Project; Technical Specification Group Radio Access Network; NR; Radio Resource Control (RRC) protocol specification (Release 15)," Jun. 2019. (519 pages).

Fujitsu, "Discussion on physical layer structure for NR sidelink," R1-1906436, Agenda Item: 7.2.4.1, 3GPP TSG RAN WG1 #97, Reno, USA, May 13-17, 2019. (17 pages).

Intel Corporation, "Sidelink Physical Structure for Nr V2X Communication," R1-1907906, revision of R1-1906794, Agenda Item: 7.2.4.1, 3GPP TSG RAN WG1 Meeting #97, Reno, USA, May 13-17, 2019. (21 pages).

Intel Corporation, "Summary#2 for AI 7.2.4.2.2 Mode-2 Resource Allocation," R1-1907771, Agenda Item: 7.2.4.2.2, 3GPP TSG RAN WG1 Meeting #97, Reno, USA, May 13-17, 2019. (26 pages).

Qualcomm Incorporated, "Considerations on Physical Layer aspects of NR V2X," R1-2000962, Agenda Item: 7.2.4.1, 3GPP TSG RAN WG1 Meeting #100-e, Feb. 24-Mar. 6, 2020. (23 pages).

Qualcomm Incorporated, "Considerations on Physical Layer aspects of NR V2X," R1-2002537, Agenda Item: 7.2.4.1, 3GPP TSG RAN WG1 Meeting #100bis-e, Apr. 20-30, 2020. (18 pages).

Samsung, "Feature lead summary#3 for 7.2.4.1 Physical layer structure for sidelink," R1-1905877, Agenda Item: 7.2.4.1, 3GPP TSG RAN WG1 #96bis Meeting, Xi'an, China, Apr. 8-12, 2019. (26 pages).

\* cited by examiner

TRANSMISSION DEVICE, RECEPTION DEVICE, TRANSMISSION METHOD, AND RECEPTION METHOD

TECHNICAL FIELD

The present disclosure relates to a transmission apparatus, a reception apparatus, a transmission method, and a reception method.

BACKGROUND ART

With regard to the standardization of 5G Mobile Communication Systems (5(1), new radio access technologies (e.g., called "New Radio (NR)") that are not necessarily backward compatible with Long Term Evolution (LTE) or LTE-Advanced have been discussed in 3rd Generation Partnership Project (3GPP).

CITATION LIST

Non-Patent Literature

NPL 1
  3GPP TS 38.214 V15.6.0, "NR; Physical layer procedures for data (Release 15)," 2019-06

SUMMARY OF INVENTION

However, there is scope for further study on a method for improving the reliability of a transmission channel in the new radio access technologies.

One non-limiting and exemplary embodiment facilitates providing a transmission apparatus, a reception apparatus, a transmission method, and a reception method capable of improving the reliability of a transmission channel.

A transmission apparatus according to an exemplary embodiment of the present disclosure includes: control circuitry, which, in operation, determines a transmission size of a first channel in one of a first time section and a second time section based on a time resource amount used for determination of the transmission size of the first channel for an other of the first time section and the second time section, the first time section being a time section in which the first channel and a second channel are arranged, the second time section being a time section in which the first channel is arranged; and transmission circuitry, which, operation, performs transmission processing on the first channel in the first time section and the second time section based on the transmission size determined.

Note that these generic or specific aspects may be achieved by a system, an apparatus, a method, an integrated circuit, a computer program, or a recoding medium, and also by any combination of the system, the apparatus; the method, the integrated circuit, the computer program, and the recoding medium.

According to an exemplary embodiment of the present disclosure, it is possible to improve the reliability of the transmission channel.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

For example, in LTE/LTE-Advanced, a base station (e.g., sometimes referred to as an eNB) designates the size of a Transport Block (TB) (e.g., Transport Block Size (TBS)) to a terminal (e.g., also referred to as User Equipment (UE)) by control information when assigning a downlink data signal or an uplink data signal for the terminal.

Note that, for example, the downlink data signal corresponds to a downlink data channel (Physical Downlink Shared CHannel (PDSCH)), the uplink data signal corresponds to an uplink data channel (Physical Uplink Shared CHannel (PUSCH)), and the control information corresponds to a downlink control channel (Physical Downlink Control CHannel (PDCCH)). In addition, the TBS is also referred to as an information bit amount, for example.

For example, at the time of PDSCH decoding or PUSCH coding, the terminal determines (e.g., calculates) the TBS and the coding rate determined by the base station, based on a frequency-domain resource amount (e.g., the number of Resource blocks (RBs) or Physical RBs (PRBs)) and a Modulation and Coding Scheme (MCS) included in the PDCCH. The terminal determines a reception buffer size or a transmission buffer size based on the determined TBS, for example.

Also in NR, support for TBS determination by the terminal based on the control information is agreed.

In NR, unlike LTE/LTE-Advanced, the TBS is determined based on, for example, the frequency-domain resource amount (for example, the number of RBs) assigned for the TB transmission and the time-domain resource amount (for example, the number of symbols) assigned for the TB transmission (see, for example, Non-Patent Literature (hereinafter, referred to as "NPL") 1). The determination of the TBS based on the time-domain resource amount is premised on the possibility of data allocation with designation of the number of symbols in NR.

Further, it has been considered that NR supports techniques of improving the reliability of data transmission (e.g., TB transmission) not only in cellular communications hut also in various scenarios, such as communication to vehicles (e.g., Vehicle to Everything (V2X)), communication to a satellite (e.g., Non-Terrestrial Network (NTN)), or ultra reliable and low latency communications (e.g., Ultra-Reliable and Low-Latency Communications (URLLC)). Examples of the techniques for improving the reliability of data transmission include a technique of transmitting the same TB a plurality of times (e.g., referred to as "repetition" and "blind retransmission").

For example, when the same TB is transmitted a plurality of times, it may happen that a receiving side such as a base station (e.g., also called eNB or gNB) or a terminal (e.g., also called UE) misrecognizes the reception of the TB as reception of a different TB and cannot combine TBs if different TBSs are configured respectively for the TBs in a plurality of transmissions. For this reason, depending on the TBS configuration, it may happen that the reliability of TB transmission cannot be improved.

In NR, for example, a base station or a transmitting terminal determines the size of a data signal (e.g., TBS) during a PDSCH or PUSCH transmission. Further, control information including resource allocation in the PDSCH or PUSCH is transmitted by the base station or the transmitting terminal to a receiving terminal, for example, by a channel different from PDSCH (for example, a PDCCH).

Further, when receiving the data signal (e.g., TB), the base station or the receiving terminal determines (e.g., calculates) the TBS based on information such as time-domain resource allocation information, frequency-domain resource allocation information (e.g., the number of PRBs), the number of DeModulation Reference Signals (DM-RSs), MCS order, or Coding Rate for the TB that is indicated by the base station or the transmitting terminal by the control information.

An example of determination (example of calculation) of the TBS will be described.

For example, a terminal (e.g., UE) calculates the number of REs ($N'_{RE}$) included in one PRB. For example, the number of REs ($N'_{RE}$) may be calculated in accordance with following Equation 1:

(Equation 1)

$$N'_{RE} = N_{sc}^{RB} \cdot N_{symb}^{sh} - N_{DMRS}^{PRB} - N_{oh}^{PRB} \quad [1].$$

Here, "$N_{SC}^{RB}$" denotes the number of subcarriers included in one PRB (e.g., $N_{SC}^{RB}=12$), "$N_{Symb}^{sh}$" denotes the number of symbols assigned for the PDSCH, "$N_{DMRS}^{PRB}$" denotes the number of REs used for a DM-RS included in one PRB, and "$N_{oh}^{PRB}$" denotes a value configured by the higher layer.

Next, in accordance with, for example, following Equation 2, the UE calculates the total number of REs ($N_{RE}$) allocated for the PDSCH:

(Equation 2)

$$N_{RE} = \min(156, N'_{RE}) \cdot n_{PRB} \quad [2].$$

Here, "$n_{PRB}$" denotes the total number of PRBs allocated for the UE.

Next, the terminal calculates $N_{info}$ indicating an intermediate value of the number of (Intermediate Number of) information bits of the data being transmitted in the PDSCH. For example, intermediate number $N_{info}$ may be calculated in accordance with following Equation 3:

(Equation 3)

$$N_{info} = N_{RE} \cdot R \cdot Q_m \cdot v \quad [3].$$

Here, "R" denotes the coding rate (Target Code Rate), "$Q_m$" denotes the modulation order, and "v" denotes the number of layers.

The terminal then determines the TBS based on value $N'_{info}$ quantized according to the value of intermediate number $N_{info}$.

The example of determination of the TBS (an example using calculation) has been described above.

It is assumed that transmissions in repeated transmission or retransmission of the same TB are assigned resources, for example, by individual control signals (e.g., PDCCHs, PUCCHs or Physical Sidelink Shared CHannels (PSSCHs). Therefore, even in the case of the same TB, different TBSs may be calculated, for example, between at the time of initial transmission and at the time of a retransmission in the repeated transmission or retransmission.

For example, the base station or the receiving terminal determines the buffer size of the reception buffer based on the TBS calculated at the time of TB reception. Note that, the reception buffer temporarily buffers the received TB. Then, at the time of repeated transmission or retransmission, the base station or the receiving terminal combines the buffered TB corresponding to the previous transmission (e.g., initial transmission) and the TB at the time of repeated transmission or retransmission, and decodes the TBs.

Therefore, when different TBSs are calculated for respective transmissions in repeated transmission or retransmission of the same TB, it may happen that combining cannot result in an improved reliability of the decoding result since the sizes of the data combined together (or buffers in which the data is buffered) are different from each other.

For example, for direct transmission and reception between terminals using a Sidelink (SL) or a link called PC5 (in other words, communication performed not via a network including a base station), the NR V2X scenarios assume support for a channel such as a Physical Sidelink Control CHannel (PSCCH), a PSSCH, a Physical Sidelink Feedback CHannel (PSFCH), or a Physical Sidelink Broadcast CHannel (PSSCH).

For example, the PSSCH is a channel for TB transmission. It is assumed that the transmitting terminal determines the TBS during TB transmission by the PSSCH and the receiving terminal determines (e.g., calculates) the TBS during TB reception by the PSSCH.

Further, for example, the PSFCH is a channel for the receiving terminal to indicate the transmitting terminal of the success or failure of decoding of a PSSCH. It is assumed that the last one symbol in at least a certain slot is used as a PSFCH resource, for example. Further, the PSFCH is not limited to the case of transmission per slot. For example, when there is no terminal transmitting the PSFCH, it is assumed that no resource is allocated for the PSFCH.

Further, for example, allocation of the PSFCH to every slot, to every two slots, and to every four slots can be assumed as the periodicity of slots to which the PSFCH resource can be allocated. It is assumed that information on the periodicity of the slots to which the PSFCH resource can be allocated is configured, for example, by the higher layer, an application layer, or the like. Support for other periodicities are also contemplated. In addition, it is also assumed that allocation or non allocation of the PSFCH resource to not only resources in the time domain, but also to, for example, resources (e.g., subchannels) the frequency domain changes.

From the above, it is expected that the allocation or non allocation of the PSFCH resource or the amount of PSFCH resources may vary for each subchannel or slot, and accordingly, resources allocated for a channel different from the PSFCH, such as, e.g., the PSSCH, may also vary for each subchannel or slot.

Further, for example, in the sidelink communication, the terminal cannot simultaneously perform transmission and reception. For example, even in the case of a subchannel to which no PSFCH is allocated, the terminal may be incapable of transmitting or receiving a PSCCH in a symbol in which a PSFCH is transmitted or received, when the PSFCH is transmitted or received in another subchannel.

From the above, in repeated transmission or retransmission of a TB in NR, the amount of resources that can be assigned for the TB (e.g., a PSSCH in the sidelink communication) may differ depending on the frequency-domain resources and the time-domain resources assigned for each transmission. As such, the TBS determined by the transmitter and receiver may also differ from transmission to transmission. Different TBSs from transmission to transmission may make it impossible, for example, to obtain the effect of improving the reliability of transmission in repeated transmission or retransmission.

In view of the above, one exemplary embodiment of the present disclosure will be described in relation to a method of improving the reliability of transmission in repeated transmission or retransmission.

Embodiment 1

Overview of Communication System

The communication system according to the present embodiment is, for example, a communication system supporting NR V2X communication (which may be referred to as "sidelink communication"). The communication system according to the present embodiment includes, for example, a plurality of terminals 100. Each of terminals 100 may have a configuration, for example, of one or both of a transmitting terminal and a receiving terminal.

Figure 1:
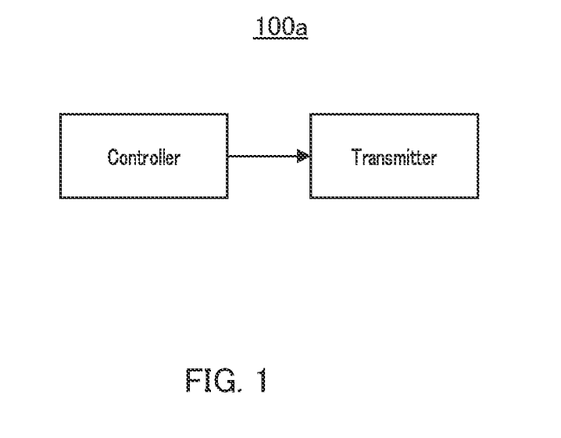
FIG. 1 is a block diagram illustrating a configuration example of a part of a transmitting terminal.

FIG. 1 is a block diagram illustrating an exemplary configuration of a part of transmitting terminal 100a, according to the present embodiment. In transmitting terminal 100a illustrated in FIG. 1, a controller (e.g., corresponding to the control circuitry) may determine the transmission data size in one of a first time section (e.g., a first slot) and a second time section (e.g., a second slot) based on, for example, the time resource amount (e.g., the number of symbols) used for determining the transmission data size (e.g., TBS) for the other one of the first time section and the second time section. For example, a data channel (e.g., PSSCH) and a channel (e.g., PSFCH) different from the data channel may be arranged in the first time section. The second time section may be a time section in which the data channel is arranged, but no channel different from the data channel is arranged. A transmitter (e.g., corresponding to the transmission circuitry) performs transmission processing (e.g., including processing such as encoding, modulation, transmission, or retransmission) on the data channel in the first time section and the second time section based on the determined transmission data size.

Figure 2:
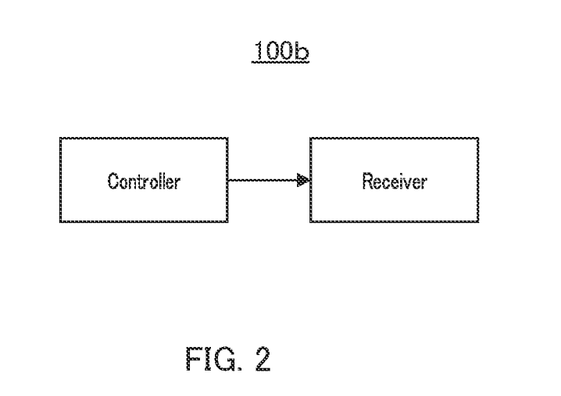
FIG. 2 is a block diagram illustrating a configuration example of a part of a receiving terminal.

FIG. 2 is a block diagram illustrating an exemplary configuration of a part of receiving terminal 100b according to the present embodiment. In receiving terminal 100b illustrated in FIG. 2, a controller (e.g., corresponding to the control circuitry) may determine the transmission data size in one of the first time section (e.g., the first slot) and the second time section (e.g., the second slot) based on, for example, the time resource amount (e.g., the number of symbols) used for determining the transmission data size (e.g., TBS) for the other one of the first time section and the second time section. For example, a data channel (e.g., PSSCH) and a channel (e.g., PSFCH) different from the data channel may be arranged in the first time section. The second time section may be a time section in which the data channel is arranged, but no channel different from the data channel is arranged. A receiver (e.g., corresponding to the reception circuitry) performs reception processing (e.g., including processing such as demodulation, decoding, and combining) on the data channel in the first time section and the second time section based on the determined transmission data size.

Configuration of Terminal

Figure 3:
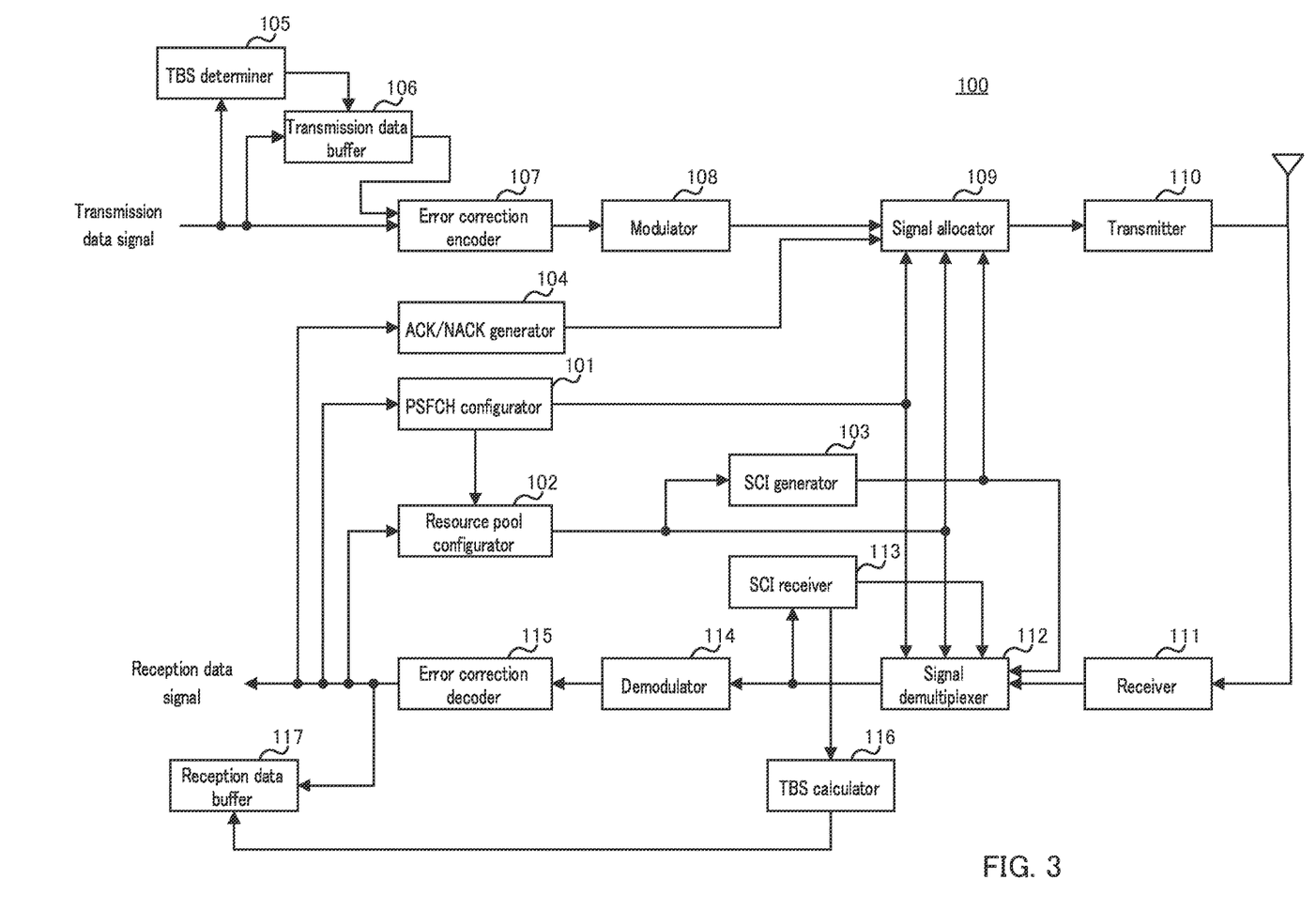
FIG. 3 is a block diagram illustrating a configuration example of the terminals.

FIG. 3 is a block diagram illustrating an exemplary configuration of terminal 100 according to the present embodiment. In FIG. 3, terminal 100 includes PSFCH configurator 101, resource pool configurator 102, SCI generator 103, ACK/NACK generator 104, TBS determiner 105, transmission data buffer 106, error correction encoder 107, modulator 108, signal allocator 109, transmitter 110, receiver 111, signal demultiplexer 112, SCI receiver 113, demodulator 114, error correction decoder 115, TBS calculator 116, and reception data buffer 117.

Note that, terminal 100 illustrated in FIG. 3 is configured to include one processing system for each of transmission data and reception data. However, for example, V2X assumes two types of communication of communication with a base station (not illustrated) and communication between terminals 100, and thus, two processing systems for each of the transmission and reception data may be included.

The controller illustrated in FIG. 1 may include, for example, TBS determiner 105 illustrated in FIG. 3, and the transmitter may include, for example, transmission data buffer 106 and transmitter 110 illustrated in FIG. 3. The controller illustrated in FIG. 2 may include, for example, TBS calculator 116 illustrated in FIG. 3, and the receiver may include, for example, receiver 111 and reception data buffer 117 illustrated in FIG. 3.

In FIG. 3. PSFCH configurator 101 configures, based on PSFCH configuration information inputted from error correction decoder 115, resource allocation (e.g., at least one of a slot or a subchannel) for the PSFCH used for feedback from the receiving terminal to the transmitting terminal. PSFCH configurator 101 outputs, for example, the information on PSFCH configuration to signal demultiplexer 112 in the case of the transmitting terminal that transmits the data related to the configured PSFCH, or outputs the PSFCH configuration to signal allocator 109 in the case of the receiving terminal related to the configured PSFCH.

Resource pool configurator 102 configures, for example, a resource set in the frequency and time domain that can be used in the sidelink communication (for example, the resource set is referred to as "resource pool"). For example, resource pool configurator 102 configures, based on information on a resource pool inputted from error correction decoder 115, a resource pool (e.g., a time resource and a frequency resource) used by terminal 100 for a sidelink. Resource pool configurator 102 outputs information on the configured resource pool to, for example, SCI generator 103, signal allocator 109, and signal demultiplexer 112 in the case of the transmitting terminal, or outputs the information to signal demultiplexer 112 in the case of the receiving terminal.

Based on, for example, the information inputted from resource pool configurator 102, SCI generator 103 generates control information (e.g., SCI) to be transmitted by the transmitting terminal to the receiving terminal. The SCI may include, for example, information on resources for transmission of a PSSCH. SCI generator 103 outputs the generated SCI to signal allocator 109 and signal demultiplexer 112.

ACK/NACK generator 104 determines, based on a reception data signal inputted from error correction decoder 115, whether or not the reception data signal has successfully been decoded. ACK/NACK generator 104 generates, based on, for example, the determination result, information indicating whether or not information on the success or failure in decoding the reception data signal is to be fed back, or information (for example, also referred to as a response signal, ACK/NACK, or HARQ-ACK) including either ACK (success in decoding) or NACK (failure in decoding), and outputs the generated information to signal allocator 109.

TBS determiner 105 determines a TBS to be configured for a transmission data signal (e.g., TB). For example, TBS determiner 105 may determine the TBS based on resource allocation information for the transmission data signal or information indicated by a higher layer (e.g., information on the PSFCH such as a slot, subchannel, or resource pool including allocated resources). TBS determiner 105 outputs the information on the determined TBS to transmission data buffer 106.

Transmission data buffer 106 temporarily buffers the transmission data signal. For example, transmission data buffer 106 may output the buffered transmission data signal to error correction encoder 107 during repeated transmission or retransmission of the transmission data signal. Further, transmission data buffer 106 may determine the amount of data to be buffered (also referred to as a buffer size) based on the information on the TBS inputted from TBS determiner 105. Transmission data buffer 106 may be, for example, a circular buffer.

The transmission data signal or the higher layer signal (or, also referred to as a higher layer parameter (not illustrated)) is inputted to error correction encoder 107, and error correction encoder 107 performs error correction coding on the input signal, and outputs the encoded signal to modulator 108.

Modulator 108 modulates the signal inputted from error correction encoder 107 and outputs the modulation signal to signal allocator 109.

Based on, for example, the information inputted from PSFCH configurator 101, the information inputted from resource pool configurator 102, and the information inputted from SCI generator 103, signal allocator 109 allocates a PSCCH signal including the SCI, a PSSCH signal including the signal inputted from modulator 108, or a PSFCH signal including the signal inputted from ACK/NACK generator 104 to sidelink radio resources. Signal allocator 109 outputs the signal allocated to the resources to transmitter 110.

Transmitter 110 performs radio transmission processing such as up-conversion on the signal inputted from signal allocator 109, and transmits a transmission signal to the receiving terminal via an antenna.

Receiver 111 receives the signal transmitted by the transmitting terminal via the antenna, and outputs the received signal to signal demultiplexer 112 after performing reception processing such as down-conversion on the received signal.

Based on, for example, the information inputted from PSFCH configurator 101, the information inputted from resource pool configurator 211, or the information inputted from SCI receiver 113, signal demultiplexer 112 outputs, to SCI receiver 113, a PSCCH signal component of the signal inputted from receiver 111 and outputs, to demodulator 114, a PSSCH signal component of the signal inputted from receiver 111.

Based on the PSCCH signal component (for example, SCI) inputted from signal demultiplexer 112, SCI receiver 113 reads (reading may be referred to as "receiving") the control information transmitted by the transmitting terminal. For example, SCI receiver 113 may output, to signal demultiplexer 112, the resource allocation information on the PSSCH addressed to terminal 100 that is included in the SCI. In addition, SCI receiver 113 may output the information on the TBS included in the SCI to TBS calculator 116.

Demodulator 114 performs demodulation processing on the signal inputted from signal demultiplexer 112 and outputs the obtained demodulation signal to error correction decoder 115.

Error correction decoder 115 decodes the demodulation signal inputted from demodulator 114, outputs information on the PSFCH configuration included in the obtained higher layer signaling to PSFCH configurator 101, and outputs information on the resource pool to resource pool configurator 102. Error correction decoder 115 outputs the obtained reception data signal to ACK/NACK generator 104 and reception data buffer 117.

Based on the information on the TBS inputted from SCI receiver 113 (e.g., resource allocation information on the TB or information on the PSFCH in a slot, subchannel, or resource pool including the allocated resources), TBS calculator 116 determines (e.g., calculates) the TBS configured for the reception data. TBS calculator 116 outputs the calculated TBS to reception data buffer 117.

Reception data buffer 117 temporarily buffers the reception data signal inputted from error correction decoder 115. For example, during repeated transmission or retransmission of the transmission data signal, reception data buffer 117 may combine the buffered reception data signal and a reception data signal inputted from error correction decoder 115. In addition, reception data buffer 117 may determine the amount of data to be buffered (also referred to as a buffer size) based on the information on the TBS inputted from TBS calculator 116 Reception data buffer 117 may be, for example, a circular buffer.

Note that, the control information on the sidelink, such as the PSFCH configuration information or the resource pool configuration information, is not limited to signaling by the higher layer, and may be configured, for example, in an application layer called "Pre-configured" or may be configured in advance in a subscriber identity module (SIM) that terminal 100 includes.

Operation of Terminals 100

Next, an example of the operation of terminals 100 (for example, the transmitting terminal and the receiving terminal) will be described.

Figure 4:
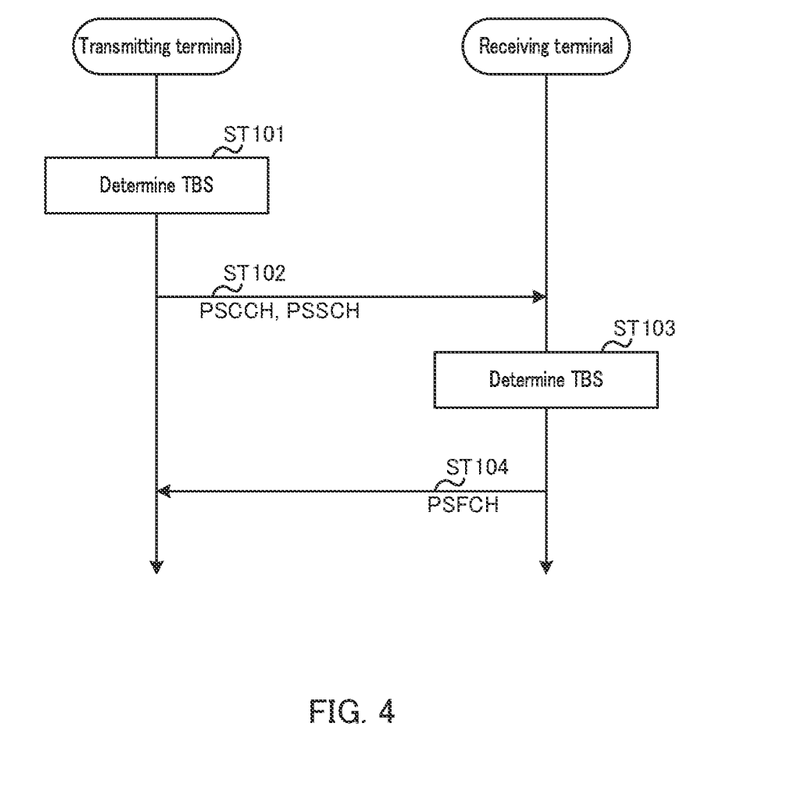
FIG. 4 is a flowchart illustrating an example of operation of the terminals.

FIG. 4 is a flowchart illustrating an example of processing of terminals 100.

The transmitting terminal determines the TBS of transmission data (e.g., TB) (ST101). For example, the transmitting terminal may determine the TBS based on PSSCH resource allocation information and information on a PSFCH.

The transmitting terminal transmits, for example, a PSCCH including SCI and a PSSCH including the transmission data to the receiving terminal (ST102). The transmitting terminal transmits the transmission data (TB) based on the determined TBS, for example. Further, the transmitting terminal buffers the transmission data in transmission data buffer 106. Note that, the transmitting terminal may determine the buffer size for the transmission data based on the TBS, for example. The PSCCH and PSSCH are received by the receiving terminal.

The receiving terminal determines (or calculates) the TBS of the data transmitted by the transmitting terminal (ST103). For example, based on the resource allocation information included in the SCI and the configuration information on the PSFCH from the higher layer, the receiving terminal may determine the TBS to be configured for the reception data. In addition, the receiving terminal buffers the reception data in reception data buffer 117. The receiving terminal may determine the buffer size for the reception data based on the TBS, for example.

For example, the receiving terminal transmits a PSFCH including ACK/NACK for the reception data to the transmitting terminal (ST104). The receiving terminal may, for example, determine a slot for transmitting the PSFCH based on PSFCH configuration information.

The transmitting terminal may retransmit the transmission data based on the PSFCH fed back from the receiving terminal, for example. Alternatively, the transmitting terminal may repeatedly transmit the transmission data. When the transmission data is repeatedly transmitted or retransmitted, the transmitting terminal and the receiving terminal may repeat the processes of ST101 to ST104 illustrated in FIG. 4, for example.

Further, the parameters relevant to the sidelink (for example, PSFCH configuration information and resource pool configuration information) may be predefined for terminal 100 in the standards, may be configured in the application layer called "Pre-configured," may be configured in advance in the SIM, or may be configured in the higher layer such as a SIB called "configured" or other RRC.

Next, an example of a TBS determination method will be described.

In the present embodiment, terminals 100 (e.g., the transmitting terminal and the receiving terminal) may configure a fixed value to the TBS(s) in a plurality of time sections (e.g., a plurality of slots) in repeated transmission or retransmission of the TB, for example, regardless of the presence or absence of PSFCH assignment or variations in the amount of resources allocated for the PSFCH. In other words, the TBS in each of the plurality of slots may be determined without considering some or all of the variations in the allocated resources for the transmission data signal for each slot, subchannel, or resource pool, for example. Note that the phrase "determined without considering XXX" may be replaced with the phrase "determined not based on XXX," "determined not depending on the XXX," or "determined independently of XXX."

Hereinafter, TBS determination methods 1 to 3 will be described.

Determination Method 1

Terminal 100 (e.g., a transmitting terminal or a receiving terminal) determines (or calculates) a TBS to be configured for transmission data based on, for example, resource allocation information on a transmission data signal (e.g., PSSCH) and information on a PSFCH. For example, terminal 100 may determine the TBS without considering the presence or absence of PSSCH assignment, some or all of the amount of resources allocated for the PSFCH, or configuration or indication relevant to the resource allocation.

For example, terminal 100 configures number $N_{symb}^{sh}$ of symbols assigned for the data signal that is used in TBS determination by the receiving terminal. Terminal 100 configures number $N_{symb}^{sh}$ of symbols to a value including the number of symbols assigned for the PSFCH and regardless of whether or not there is a symbol assigned for the PSFCH in the slot. For example, terminal 100 may configure, to the number of symbols for the PSSCH assuming a case where no PSFCH is assigned, number $N_{symb}^{sh}$ of symbols assigned for the data signal that is used in the TBS determination by the receiving terminal.

Figure 5:
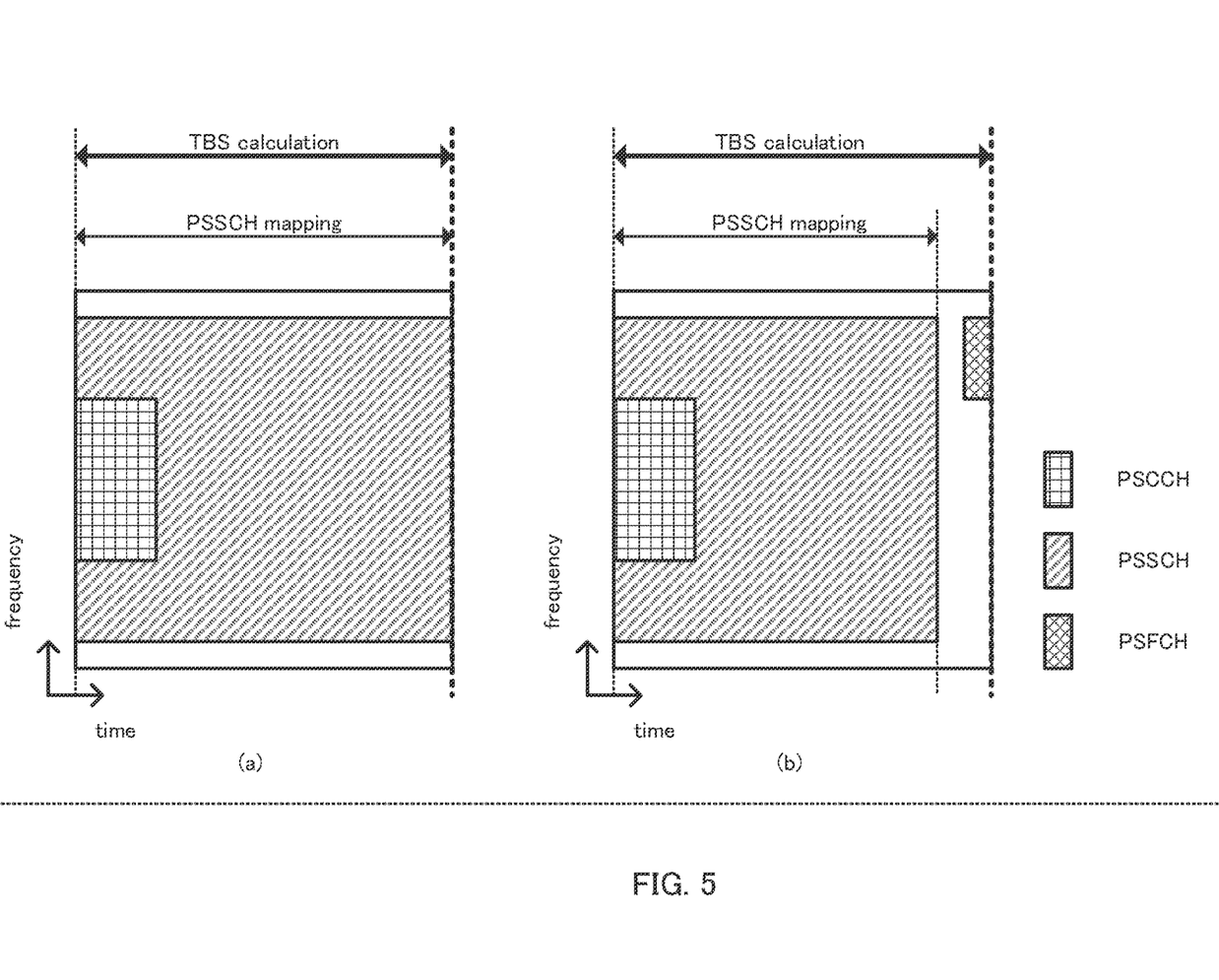
FIG. 5 illustrates an example of a Transport Block Size (TBS) determination method.

FIG. 5 illustrates an example of relationship between the amount of resources (e.g., the number of symbols) in the time domain assigned for the TB (e.g., PSSCH signal) and the amount of resources in the time domain of the TB used for the determination (or calculation) of the TBS in determination method 1.

In the example illustrated in FIG. 5, the resources (e.g., symbols) actually allocated for the TB (PSSCH) are allocated without overlapping with the resources allocated for the PSFCH. Note that the term "overlap" may be replaced with "collision."

For example, in the slot illustrated at (a) in FIG. 5, there is no PSFCH assignment, and the PSSCH is assigned up to the last symbol in the slot.

On the other hand, in the slot illustrated at (b) in FIG. 5, there is the assignment of the PSFCH, which is allocated to the last symbol in the slot. Further, at (b) in FIG. 5, the PSSCH is allocated to symbols in the slot that are different from the symbol for the PSFCH.

In determination method 1, terminal 100 determines the TBS based on the number of symbols at which the PSSCH (e.g., TB) is arranged in the slot illustrated at (a) in FIG. 5 that includes the PSSCH but not including the PSFCH. In other words, terminal 100 determines (or calculates) the TBS based on the PSSCH assignment illustrated at (a) in FIG. 5 regardless of the presence or absence of the PSFCH assignment in the slot.

For example, even in the slot illustrated at (b) in FIG. 5 (in the case where there is the PSFCH assignment), terminal 100 determines the TBS based on the PSSCH assignment (e.g., the number of symbols) in the slot illustrated at (a) in FIG. 5. In other words, terminal 100 determines the TBS in the slot illustrated at (b) in FIG. 5 based on the number of symbols used in the determination of the TBS in the slot illustrated at (a) in FIG. 5.

For example, in actual allocation to time resources (e.g., symbols) (e.g., PSSCH mapping), the PSSCH is allocated to resources that do not overlap with the resources for the PSFCH considering the allocated resources for the PSFCH. On the other hand, in the TBS determination (e.g., TBS calculation), the TBS is determined based on the allocated resources for the PSSCH in the slot illustrated at (a) in FIG. 5, regardless of the presence or absence of PSFCH assignment, and without considering the allocated resources (e.g., symbols) for the PSFCH.

In determination method 1, as illustrated in FIG. 5, terminal 100 uses, for determination of the TBS in a certain slot (for example, the slot at (b) in FIG. 5) among a plurality of slots to be repeatedly transmitted or retransmitted, number $N_{symb}^{sh}$ of symbols allocated for the data signal that is used for determining the TBS in another slot (for example, the slot at (a) in FIG. 5) of the plurality of slots. By this determination, determination method 1 allows terminal 100 to determine the same TBS in a plurality of slots regardless of the presence or absence of PSFCH, as illustrated in FIG. 5.

Determination Method 2

Terminal 100 (e.g., a transmitting terminal or a receiving terminal) determines (or calculates) a TBS to be configured for transmission data based on, for example, resource allocation information of a transmission data signal (e.g., PSSCH) and information on a PSFCH. Fax example, terminal 100 may determine the TBS considering the presence or absence of PSSCH assignment, some or all of the amount of resources allocated for the PSFCH, or configuration or indication relevant to resource allocation.

For example, terminal 100 configures number $N_{symb}^{sh}$ of symbols assigned for the data signal that is used in TBS determination by the receiving terminal. Terminal 100 configures number $N_{symb}^{sh}$ of symbols to a value not including the number of symbols assigned for the PSFCH and regardless of whether or not there is a symbol assigned for the PSFCH in the slot. For example, terminal 100 may configure, to the number of symbols for the PSSCH assuming the case where the PSFCH is assigned, number $N_{symb}^{sh}$ of symbols assigned for the data signal that is used in the TBS determination by the receiving terminal.

Figure 6:
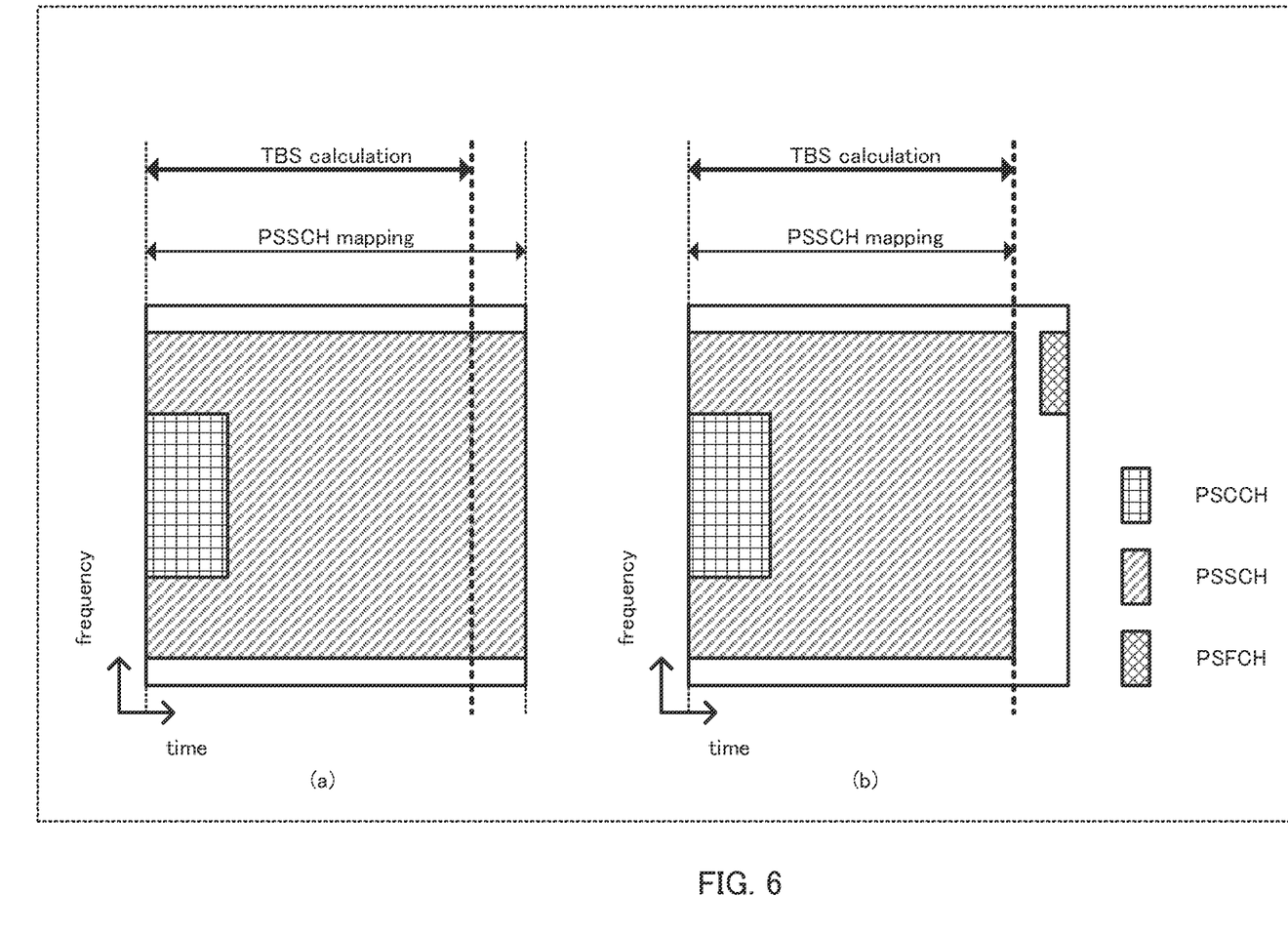
FIG. 6 illustrates another example of the TBS determination method.

FIG. 6 illustrates an example of relationship between the amount of resources (e.g., the number of symbols) in the time domain assigned for the TB (e.g., PSSCH signal) and the amount of resources in the time domain of the TB used for the determination (or calculation) of the TBS in determination method 2.

In the example illustrated in FIG. 6, the resources (e.g., symbols) actually allocated for the TB (PSSCH) are allocated without overlapping with the resources allocated for the PSFCH.

For example, in the slot illustrated at (a) in FIG. 6, there is no PSFCH assignment, and the PSSCH is assigned up to the last symbol in the slot.

On the other hand, in the slat illustrated at (b) in FIG. 6, there is the assignment of the PSFCH, which is allocated to the last symbol in the slot. Further, at (b) in FIG. 6, the PSSCH is allocated to symbols in the slot that are different from the symbol for the PSFCH.

In determination method 2, terminal 100 determines the TBS based on the number of symbols at which the PSSCH (e.g., TB) is arranged in the slot illustrated at (b) in FIG. 6 that includes the PSSCH and the PSFCH. In other words, terminal 100 determines (or calculates) the TBS based on the PSSCH assignment illustrated at (b) in FIG. 6 regardless of the presence or absence of the PSFCH assignment in the slot.

For example, even in the slot illustrated at (a) in FIG. 6 (in the case where there is no PSFCH assignment), terminal 100 determines the TBS based on the PSSCH assignment (e.g., the number of symbols) in the slot illustrated at (b) in FIG. 6. In other words, terminal 100 determines the TBS in the slot illustrated at (a) in FIG. 6 based on the number of symbols used in the determination of the TBS in the slot illustrated at (b) in FIG. 6.

For example, in actual assignment to time resources (e.g., symbols) (e.g., PSSCH mapping), the PSSCH is assigned to resources that do not overlap with the resources for the PSFCH considering the allocated resources for the PSFCH. On the other hand, in the TBS determination (e.g., TBS calculation), the TBS is determined based on the allocated resources for the PSSCH in the slot illustrated at (b) in FIG. 6, regardless of the presence or absence of PSFCH assignment, and considering the allocated resources (e.g., symbols) for the PSFCH.

In determination method 2, as illustrated in FIG. 6, terminal 100 uses, for determination of the TBS in a certain slot (for example, the slot at (a) in FIG. 6) among a plurality of slots to be repeatedly transmitted or retransmitted, number $N_{symb}^{sh}$ of symbols allocated for the data signal that is used for determining the TBS in another slot (for example, the slot at (b) in FIG. 6) of the plurality of slots. By this determination, determination method 2 allows terminal 100 to determine the same TBS in a plurality of slots regardless of the presence or absence of PSFCH, as illustrated in FIG. 6.

Determination Method 3

In determination method 3, terminal 100 (e.g., a transmitting terminal or a receiving terminal) determines (or calculates) a TBS to be configured for transmission data based on, for example, resource allocation information of a transmission data signal (e.g., PSSCH) and information on a PSFCH.

In determination method 3, terminal 100 determines, for example, based on the configuration or indication for or to terminal 100, number $N_{symb}^{sh}$ of symbols allocated for the data signal used for the TBS determination. In other words, terminal 100 determines, based on the configuration or the indication, whether or not to consider the configuration relevant to the PSFCH when determining the TBS.

For example, in a case where not considering the configuration relevant to the PSFCH is configured or indicated for or to terminal 100, terminal 100 may determine the TBS based on the allocated resource amount (e.g., number of symbols) for the PSSCH in the slot including the PSSCH but including no PSFCH as in determination method 1. On the other hand, for example, in a case where considering the configuration relevant to the PSFCH is configured or indicated for or to terminal 100, terminal 100 may determine the TBS based on the allocated resource mount (e.g., number of symbols) for the PSSCH in the slot including the PSSCH and the PSFCH as in determination method 2.

In other words, the time resource amount (e.g., number $N_{symb}^{sh}$ of symbols) used by terminal 100 as a basis for the TBS determination is a value based on the number of symbols at which the TB is arranged in one of the slot including the PSSCH but not including the PSFCH and the slot including the PSSCH and the PSFCH, and the one of the slots is indicated to terminal 100 or configured for terminal 100.

Determination method 3 allows terminal 100 to select, for example, one of determination method 1 and determination method 2 which is suitable for TBS determination by terminal 100. For example, the determination methods for determining the TBS may be configured or indicated for or to terminal 100 based on the capability of terminal 100 (e.g., UE capability, buffer size, or the like).

The determination methods of determining the TBS have been described above.

Next, operation examples related to TBS determination will be described.

Operation Example 1

Operation example 1 will be described in relation to TBS determination processing.

Operation Example 1-1

In operation example 1-1, in the resource allocation information on the TB used for the TBS determination by the transmitting terminal and the receiving terminal, a fixed value or a group of candidates, for example, is defined according to the standards (or specifications) for the number of symbols (e.g., $N_{symb}^{sh}$) assigned for the TB.

For example, number $N_{symb}^{sh}$ of symbols assigned for the data signal that is used for the TBS calculation by the receiving terminal may be configured to a fixed value in the standards or may be selected from the group of candidates defined in the standards.

Here, when the group of candidates is given for number $N_{symb}^{sh}$ of symbols, terminal 100 may determine a candidate to be selected from the group of candidates based on the indication by the SCI, the configuration by the higher layer, or the like, or may be determined according to a certain criterion.

By operation example 1-1, for example, it is possible to eliminate the need for indication of a fixed value or a group of candidates for number $N_{symb}^{sh}$ of symbols used for TBS determination, so as to reduce the signaling amount.

Operation Example 1-2

In operation example 1-2, the transmitting terminal and the receiving terminal determine the TBS based on the number of symbols allocated for the TB that is used in TBS determination (or TBS calculation) and based on whether or not the allocated symbols overlap with symbols to which the PSFCH may be allocated.

Hereinafter, an example in which operation example 1-2 is applied to each of determination method 1 and determination method 2 for determination of the TBS will be described.

Operation Example 1-2a

An example in which operation example 1-2 is applied to determination method 1 for determination of the TBS will be described.

For example, it is assured that resources in a slot that are not allocated for any other channels or signals different from the PSSCH are configured as resources allocated for the PSSCH.

Here, the resources allocated for other channels or signals different from the PSSCH may include, for example, resources allocated for a PSFCH, PSFCH, a symbol corresponding to a switching transient time between transmission and reception and between reception and transmission, or a symbol corresponding to Automatic Gain Control (AGC).

Terminal 100 (transmitting terminal or receiving terminal) may, for example, determine number $N_{symb}^{sh}$ of symbols used to determine the TBS, depending on whether or not the resources allocated for the PSSCH overlap with the resources that may be allocated for the PSFCH.

For example, terminal 100 may configure the number of symbols allocated for the PSSCH as $N_{symb}^{sh}$ when the PSSCH resources and the PSFCH resources overlap with each other. On the other hand, when the PSSCH resources and the PSFCH resources do not overlap with each other, terminal 100 may configure, as $N_{symb}^{sh}$, the number of symbols allocated for the PSSCH plus the number of symbols allocated for the PSFCH.

Further, for example, as in NR of Rel. 16, it is assumed that the control information (e.g., DCI or SCI) indicates the leading symbol in a slot among resources to which the data channel PDSCH or PSSCH) is allocated and the symbol length of allocated symbols.

For example, based on this indication, the transmitting terminal and the receiving terminal may determine whether or not the resources allocated for the PSSCH overlap with the resources to which the PSFCH may be allocated. Number $N_{symb}^{sh}$ of symbols in the TBS determination varies depending on a result of determination by the transmitting terminal and the receiving terminal. For example, when the PSSCH resources and the PSFCH resources overlap with each other, the number of symbols allocated for the PSSCH is configured as number $N_{symb}^{sh}$ of symbols in the TBS determination. On the other hand, when the PSSCH resources and the PSFCH resources do not overlap with each other, the number of symbols allocated for the PSSCH plus the number of symbols allocated for the PSFCH is configured as the value of number $N_{symb}^{sh}$ of symbols in the TBS determination.

Even when repeated transmission or retransmission of the same TB occurs, operation example 1-2a makes it possible for terminal 100 (transmitting terminal or receiving terminal) to determine the same TBS for the data signal (e.g., PSSCH) related to the repeated transmission or retransmission, regardless of the overlap between the PSSCH resources and the PSFCH resources. Further, operation example 1-2a makes it possible for terminal 100 to flexibly allocate resources for each transmission data according to the status of the slat or subchannel, for example.

Operation Example 1-2b

An example in which operation example 1-2 is applied to determination method 2 for determination of the TBS will be described.

For example, it is assumed that resources in a slot that are not allocated for any other channels or signals different from the PSSCH are configured as resources allocated for the PSSCH.

Here, the resources allocated for other channels or signals different from the PSSCH may include, for example, resources allocated for a PSCCH, PSFCH, a symbol corresponding to a switching transient time between transmission and reception and between reception and transmission, or a symbol corresponding AGC.

Terminal 100 (transmitting terminal or receiving terminal) may, for example, determine number $N_{symb}^{sh}$ of symbols used to determine the TBS, depending on whether or not the resources allocated for the PSSCH overlap with the resources that may be allocated for the PSFCH.

For example, when the PSSCH resources and the PSFCH resources overlap with each other, terminal 100 may configure, as $N_{symb}^{sh}$, the number of symbols allocated for the PSSCH minus the number of symbols allocated for the PSFCH. On the other hand, terminal 100 may configure the number of symbols allocated for the PSSCH as $N_{symb}^{sh}$ when the PSSCH resources and the PSFCH resources do not overlap with each other.

Further, for example, as in NR of Rel. 16, it is assumed that the control information (e.g., DCI or SCI) indicates the leading symbol in a slot among resources to which the data channel (e.g., PSSCH or PSSCH) is allocated and the symbol length of allocated symbols.

For example, based on this indication, the transmitting terminal and the receiving terminal may determine whether or not the resources allocated tier the PSSCH overlap with the resources to which the PSFCH may be allocated. Number $N_{symb}^{sh}$ of symbols in the TBS determination varies depending on a result of determination by the transmitting terminal and the receiving terminal. For example, when the PSSCH resources and the PSFCH resources overlap with each other, the number of symbols allocated for the PSSCH minus the number of symbols allocated for the PSFCH is configured as the value of number $N_{symb}^{sh}$ of symbols in the TBS determination. On the other hand, when the PSSCH resources and the PSFCH resources do not overlap with each other, the number of symbols allocated for the PSSCH is configured as number $N_{symb}^{sh}$ of symbols in the TBS determination.

Even when repeated transmission or retransmission of the same TB occurs, operation example 1-2b makes it possible for terminal 100 (transmitting terminal or receiving terminal) to determine the same TBS for the data signal (e.g., PSSCH) related to the repeated transmission or retransmission, regardless of the overlap between the PSSCH resources and the PSFCH resources. Further, operation example 1-2b makes it possible for terminal 100 to flexibly allocate resources for each transmission data according to the status of the slot or subchannel, for example.

Operation Example 2

Operation example 2 will be described in relation to processing after the TBS determination and actual resource allocation determination.

In the following, a description will be given of an example of an adjustment method of adjusting a Coding Rate, for example, after the TBS and resources allocated for a data channel (e.g., PDSCH, PUSCH, or PSSCH) actually used for transmission of the TB are determined by the transmitting terminal.

Operation Example 2-1

In determination method 1 or determination method 3 for TBS determination, the number of symbols ($N_{symb}^{sh}$) that the receiving terminal recognizes as allocated for a data signal and uses in the TBS determination may be greater than the number of symbols actually allocated for the data signal, for example, as illustrated at (b) in FIG. 5. In this case, the TBS configured for the TB may be larger than the TBS determined based on the number of symbols actually allocated for the TB. Further, for example, at (b) in FIG. 5, the TB may be allocated to resources (e.g., PSSCH resources) that are smaller than the resources corresponding to the determined TBS.

Thus, the transmitting terminal may puncture the transmission data, for example. This processing is also referred to as puncturing, for example. The puncturing of the transmission data allows the transmitting terminal to allocate the punctured transmission data to, for example, the resources (for example, PSSCH resources) smaller than the resources corresponding to the determined TBS.

It is thus possible to suppress a decrease in the reliability of transmission due to reduction in allocated resources as a result of allocation, to the resources smaller than the resources corresponding to the determined TBS, the TB for which the TBS larger than the TBS configured based on the number of actually allocated symbols is determined. In addition, repeated transmission of the TB makes it possible to further improve the reliability of transmission.

Operation Example 2-2

In determination method 2 or determination method 3 for TBS determination, the number of symbols ($N_{symb}^{sh}$) that the receiving terminal recognizes as allocated for a data signal and uses in the TBS determination may be smaller than the number of symbols actually allocated for the data signal, for example, as illustrated at (a) in FIG. 6. In this case, the TBS configured for the TB may be smaller than the TBS determined based on the number of symbols actually allocated for the TB. Further, for example, at (a) in FIG. 6, the TB may be allocated to resources (e.g., PSSCH resources) that are larger than the resources corresponding to the determined TBS.

Therefore, the transmitting terminal may adjust the coding rate by adding, for example, a redundant bit or the like to the transmission data. The adjustment of the coding rate allows the transmitting terminal to allocate, to, for example, the resources (for example, PSSCH resources) larger than the resources corresponding to the determined TBS, the transmission data to which the redundant bit is added.

Therefore, for example, even when the TB for which the TBS smaller than the TBS determined based on the number of actually allocated symbols is configured is allocated to resources larger than the resources corresponding to the configured TBS, it is possible to improve the resource utilization efficiency of utilizing the allocated resources, to improve the reliability of transmission.

Operation Example 3

Operation example 3 will be described in relation to an operation performed at the time of Resource reservation.

In NR V2X, an operation is expected, for example, in which resources for a plurality of PSSCHs are reserved on a resource pool by single SCI to avoid collisions with transmissions of other terminals. This operation is also referred to as "Resource reservation." In the Resource reservation, a plurality of PSSCHs may be used for repeated transmission or retransmission of the same TB, or may be used for a plurality of different TBs.

For example, when information on resources for a plurality of PSSCHs is indicated by single SCI in the Resource reservation, above-described determination methods 1 to 3 for TBS determination may be applied to TBS determination (or TBS calculation) of the TB(s) transmitted in a plurality of PSSCHs. For example, when the resources for a plurality of PSSCHs are reserved by single SCI and a plurality of PSSCHs are used for repeated transmission or retransmission of the same TB, the receiving terminal can calculate the same TBS in the reception and decoding processes of receiving and decoding the plurality of PSSCHs. Calculation of the same TBS can improve the reliability of the decoding results by combining decoding results based on a plurality of PSSCHs.

The operation examples have been described above.

In the present embodiment, based on, for example, the number of symbols used for determining the PSSCH transmission size (e.g., TBS) with respect to one of the slot in which the PSSCH and the PSFCH are arranged and the slot in which the PSSCH is arranged, terminals 100 (e.g., the transmitting terminal and the receiving terminal) determine the TBS for the other slot. Then, the transmitting terminal performs transmission processing on the PSSCH in each of the slots based on the determined TBS, and the receiving terminal performs reception processing on the PSSCH in each of the slots based on the determined TBS.

This operation makes it possible to configure the same TBS for each transmission, for example, even if the resources allocated for the PSSCH or PSFCH can be different between the transmissions when the TB is repeatedly transmitted or retransmitted. Configuration of the same TBS can, for example, lead to configuration of the same buffer size of the transmission data or the buffer size of the reception data, and can thus improve the reliability of the transmission channels (e.g., PSSCH or TB).

The embodiments of the present disclosure have been described above.

Other Embodiments

By way of example, the above embodiment has been described in which NR V2X scenarios are assumed. However, one exemplary embodiment of the present disclosure is not limited to NR V2X, and is applicable to multiple times of transmissions (or retransmissions) of the same TB in various NR-based scenarios, such as e.g., enhanced Mobile Broadband (eMBB), URLLC, NTN, and NR-U. In this case, for example, the transmitting terminal in the above embodiment may be replaced with a base station or a terminal, the PSCCH may be replaced with a PDCCH or a PUCCH, the PSSCH may be replaced with a PDSCH or a PUSCH, the PSFCH may be replaced with a PUCCH, the SCI may be replaced with DCI, the resource pool may be replaced with a Component Carrier (CC), and the subchannel may be replaced with Bandwidth Part (BWP).

The above-described embodiment is not limited to the case where, in the TBS determination, the presence or absence of a symbol or variation in the number of symbols for the PSFCH is concerned, but the presence or absence of a symbol or variation in the number of symbols for other channels or signals different from the PSFCH, or other symbols or resources may be concerned. For example, in NR V2X scenarios, the PSFCH may be substituted by the PSCCH, PSSCH, PSBCH, a symbol corresponding to a transient time for switching between transmission and reception or switching between reception and transmission, or a symbol corresponding to AGC.

Regarding the TBS determination, the above-described embodiment is not limited to the case of the presence or absence of a symbol or variation in the number of symbols for the PSFCH symbol allocated to a subchannel, slot, or the subchannel and slot the same as the resource allocation of the TB corresponding to the TBS. However, the present disclosure can also be applied to the PSFCH symbol allocated to a different subchannel and slot.

In the above embodiment, the channel for which the transmission size (e.g., TBS) is determined is not limited to the data channel (e.g., PSSCH, PDSCH, or PUSCH), but may be another channel.

Further, in the sidelink, examples of the transmitting terminal and the receiving terminal may include a terminal that performs transmission processing but does not perform reception processing, a terminal that performs reception processing but does not perform transmission processing, or a terminal that performs both transmission and reception.

The examples as illustrated, for example, in FIGS. 5 and 6 in which the PSCCH is arranged in several leading symbols of the PSSCH have been described as an example of the arrangement of the PSCCH and PSSCH, but the arrangement of the PSCCH and PSSCH is not limited to the arrangement illustrated in FIGS. 5 and 6. For example, the above embodiment can be applied to arrangement in which the PSCCH and PSSCH are time division multiplexed (TDM) and arrangement in which the PSCCH and PSSCH are frequency division multiplexed (FDM).

The format of the PSFCH is not limited to the format in which the PSFCH is arranged in the last one symbol in the slot as illustrated, for example, in FIGS. 5 and 6, but may be another format. For example, the PSFCH may be arranged in a symbol different from the last one in the slot. In addition, for example, the PSFCH may be arranged in two or more symbols.

Further, the above embodiment has been described in relation to the case where, for example, the TBS is determined for each of a plurality of slots repeatedly transmitted or retransmitted, but the present disclosure is not limited thereto, and the TBS configured for a plurality of slots repeatedly transmitted or retransmitted may be determined for a certain slot. In other words, the TBS(s) configured for a plurality of slots repeatedly transmitted or retransmitted do not have to be determined for each of the plurality of slots.

The number of allocated symbols for the PSSCH may be assigned, for example, according to a corresponding PSCCH or may be preconfigured at the time of resource pool configuration.

The slots in which the TB is transmitted multiple times may be temporally consecutive slots, or may be temporally inconsecutive slots.

The unit of time resource is not limited to a combination of slots and symbols, and may be, for example, a unit of time resource such as a frame, a sub-frame, a slot, a sub-slot or a symbol, or may be another unit of resource such as a resource element (RE).

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The transmission apparatus according to an exemplary embodiment of the present disclosure includes: control circuitry, which, in operation, determines a transmission size of a first channel in one of a first time section and a second time section based on a time resource amount used for determination of the transmission size of the first channel for an other of the first time section and the second time section, the first time section being a time section in which the first channel and a second channel are arranged, the second time section being a time section in which the first channel is arranged; and transmission circuitry, which, in operation, performs transmission processing on the first channel in the first time section and the second time section based on the transmission size determined.

In an exemplary embodiment of the present disclosure, the time resource amount is a number of symbols at which the first channel is arranged in the first time section.

In an exemplary embodiment of the present disclosure, the time resource amount is a number of symbols at which the first channel is arranged in the second time section.

In an exemplary embodiment of the present disclosure, the time resource amount is a number of symbols at which the first channel is arranged in one of the first time section and the second time section, and the one time section is indicated to the transmission apparatus or configured for the transmission apparatus.

In an exemplary embodiment of the present disclosure, the control circuitry determines a buffer size of a buffer corresponding to the first channel based on the transmission size.

In an exemplary embodiment of the present disclosure, the first channel is a data channel to be repeatedly transmitted in the first time section and the second time section, or a data channel to be retransmitted in one of the first time section and the second time section with respect to transmission in an other of the first time section and the second time section.

A reception apparatus according to an exemplary embodiment of the present disclosure includes: control circuitry, which, in operation, determines a transmission size of a first channel in one of a first time section and a second time section based on a time resource amount used for determination of the transmission size of the first channel for an other of the first time section and the second time section, the first time section being a time section in which the first channel and a second channel are arranged, the second time section being a time section in which the first channel is arranged; and reception circuitry, which, in operation, performs reception processing on the first channel in the first time section and the second time section based on the transmission size determined.

A transmission method according to an exemplary embodiment of the present disclosure includes steps performed by a transmission apparatus of: determining a transmission size of a first channel in one of a first time section and a second time section based on a time resource amount used for determination of the transmission size of the first channel for an other of the first time section and the second time section, the first time section being a time section in which the first channel and a second channel are arranged, the second time section being a time section in which the first channel is arranged; and performing transmission processing on the first channel in the first time section and the second time section based on the transmission size determined.

A reception method according to an exemplary embodiment of the present disclosure includes steps performed by a reception apparatus of: determining a transmission size of a first channel in one of a first time section and a second time section based on a time resource amount used for determination of the transmission size of the first channel for an other of the first time section and the second time section, the first time section being a time section in which the first channel and a second channel are arranged, the second time section being a time section in which the first channel is arranged; and performing reception processing on the first channel in the first time section and the second time section based on the transmission size determined.

The disclosure of Japanese Patent Application No. 2019-149143 dated Aug. 15, 2019 including the specification, drawings and abstract is incorporated herein by reference in its entirety.

INDUSTRIAL APPLICABILITY

An exemplary embodiment of the present disclosure is useful for mobile communication systems.

REFERENCE SIGNS LIST

100 Terminal
101 PSFCH configurator
102 Resource pool configurator
103 SCI generator
104 ACK/NACK generator
105 TBS determiner
106 Transmission data buffer
107 Error correction encoder
108 Modulator
109 Signal allocator
110 Transmitter
111 Receiver
112 Signal demultiplexer
113 SCI receiver
114 Demodulator
115 Error correction decoder
116 TBS calculator
117 Reception data buffer

The invention claimed is:
1. A transmission apparatus, comprising:
control circuitry, which, in operation, determines a transmission size of a first channel in a first time section and in a second time section based on a first number of symbols, the first time section being a time section in which the first channel and a second channel are arranged, the second time section being a time section in which the first channel is arranged; and transmission circuitry, which, in operation, performs transmission processing on the first channel in the first time section and the second time section based on the determined transmission size, wherein the first channel is a Physical Sidelink Shared Channel (PSSCH), and the first number of symbols is determined by excluding a second number of symbols of the second channel in a first case, the second number of symbols being a same number of symbols in the first time section and in the second time section.

2. The transmission apparatus according to claim 1, wherein the first number of symbols is determined by including the second number of symbols of the second channel in a second case, and one of the first case or the second case is indicated to the transmission apparatus or configured for the transmission apparatus.

3. The transmission apparatus according to claim 1, wherein the control circuitry determines a buffer size of a buffer corresponding to the first channel based on the transmission size.

4. The transmission apparatus according to claim 1, wherein the first channel is a data channel to be repeatedly transmitted in the first time section and the second time section, or a data channel to be retransmitted in one of the first time section and the second time section with respect to transmission in another of the first time section and the second time section.

5. The transmission apparatus according to claim 1, wherein whether the determination of the transmission size of the first channel in one of the first time section and the second time section is based on the time resource amount used for determination of the transmission size of the first channel for another of the first time section and the second time section is indicated to the transmission apparatus.

6. The transmission apparatus according to claim 1, wherein in a case where the first channel is assigned to resources, which are smaller than a resource amount corresponding to the determined transmission size, a part of data of the first channel is not transmitted.

7. The transmission apparatus according to claim 1, wherein in a case where the first channel is assigned to resources, which are larger than a resource amount corresponding to the determined transmission size, a coding rate of data of the first channel is adjusted.

8. A transmission method performed by a transmission apparatus, the transmission method comprising:

determining a transmission size of a first channel in a first time section and in a second time section based on a first number of symbols, the first time section being a time section in which the first channel and a second channel are arranged, the second time section being a time section in which the first channel is arranged; and performing transmission processing on the first channel in the first time section and the second time section based on the determined transmission size, wherein, the first channel is a Physical Sidelink Shared Channel (PSSCH), and the first number of symbols is determined by excluding a second number of symbols of the second channel in a first case, the second number of symbols being a same number of symbols in the first time section and in the second time section.

9. The transmission method according to claim 8, wherein the first number of symbols is determined by including the second number of symbols of the second channel in a second case, and one of the first case or the second case is indicated to the transmission apparatus or configured for the transmission apparatus.

10. The transmission method according to claim 8, wherein whether the determination of the transmission size of the first channel in one of the first time section and the second time section is based on the time resource amount used for determination of the transmission size of the first channel for another of the first time section and the second time section is indicated to the transmission apparatus.

11. The transmission method according to claim 8, wherein in a case where the first channel is assigned to resources, which are smaller than a resource amount corresponding to the determined transmission size, a part of data of the first channel is not transmitted.

12. The transmission method according to claim 8, wherein in a case where the first channel is assigned to resources, which are larger than a resource amount corresponding to the determined transmission size, a coding rate of data of the first channel is adjusted.

* * * * *